United States Patent [19]

Galla et al.

[11] Patent Number: 4,525,316

[45] Date of Patent: Jun. 25, 1985

[54] SHIPPING FLEXIBLE POLYURETHANE FOAM PRODUCT

[75] Inventors: Edward A. Galla, Whitehall; Bruce A. Smoyer, Allentown, both of Pa.

[73] Assignee: Air Products and Chemicals, Inc., Allentown, Pa.

[21] Appl. No.: 580,317

[22] Filed: Feb. 15, 1984

[51] Int. Cl.³ ............................................. B29D 27/00
[52] U.S. Cl. ....................................... 264/54; 53/121; 53/523; 53/527; 264/321; 521/115; 528/53
[58] Field of Search ................. 264/321, 54; 521/115; 528/53; 53/111 R, 121, 122, 527, 523

[56] References Cited

U.S. PATENT DOCUMENTS

| | | | |
|---|---|---|---|
| 3,202,998 | 8/1965 | Hoffman | 264/321 X |
| 3,741,416 | 6/1973 | Bilbow | 53/527 X |
| 4,065,910 | 1/1978 | Eiselt | 53/527 X |
| 4,194,069 | 3/1980 | Speranza et al. | 528/53 X |
| 4,326,042 | 4/1982 | Zimmerman | 528/53 X |

Primary Examiner—Philip Anderson
Attorney, Agent, or Firm—Michael Leach; James C. Simmons; E. Eugene Innis

[57] ABSTRACT

A method for shipping flexible polyurethane foam product comprising (a) reacting a flexible polyurethane foam composition containing a polyisocyanate, a polyether polyol, a surfactant, a catalyst and water to provide a foam product, (b) conditioning the foam product to develop substantially full cure, (c) applying a force to compress the product to a fraction of its original size, (d) shipping the compressed product and (e) removing the compression force so that the product may return to its original size, the improvement for reducing the conditioning time or temperature prior to compressing the foam product while ensuring the substantial restitution of the foamed product when the compression force is removed which improvement comprises employing as the catalyst in the flexible polyurethane foam composition a polyurethane catalyst which is N-alkyl morpholine or N-(dialkylaminoalky) morpholine.

20 Claims, No Drawings

SHIPPING FLEXIBLE POLYURETHANE FOAM PRODUCT

TECHNICAL FIELD

The invention relates to flexible polyurethane foams and, more particularly, to an improvement in shipping such foam product.

BACKGROUND OF THE INVENTION

A major bottleneck in the production of flexible polyurethane foam slabstock is the amount of time and space required to store the foamed slabstock prior to fabrication or shipping. Requisite conditioning for a certain period of time dependent upon the storage temperature and type of foam formulation is needed to permit the foamed product to become fully cured, i.e. develop the inherent property of restitution so that the product when compressed to a lesser size to facilitate shipping can return to its original dimensions once it arrives at the destination and the compressing force has been removed.

In addition, yields of foam are reduced due to the need for oversize cutting to meet end use specifications when the foam product is shipped in compression trailers.

Foam producers have attempted to improve the overall process for making and storing flexible polyurethane foam products by the use of infrared heat lamps on the production line, heating the storage buildings where the foam is allowed to cure, storing the foams for an extended period of time before fabricating or shipping and oversize cutting to compensate for lack of recovery. These solutions to the problem add to the costs and inefficiencies in the overall process from making the foamed product to its arrival at its ultimate destination.

The prior art is replete with examples of tertiary amines that can be used as catalysts alone and in combination for the reaction of polyols with polyisocyanates in the production of polyurethane foams. Catalysts which are generally used in the flexible foam art include, for example, triethylenediamine, bis(dimethylaminoethyl)ether and diemthylethanolamine, optionally in combination with a tin compound.

U.S. Pat. No. 3,786,005 discloses the use of 4-(2-dimethylaminoethyl)morpholine as the principal amine catalyst for the reaction of polyols and polyisocyanates to make polyurethane foams. Example 2 shows its use in a flexible polyurethane foam composition containing a polyether polyol.

SUMMARY OF THE INVENTION

The present invention provides an improvement with regard to a method for conditioning, cutting and shipping flexible polyurethane foam product. The overall procedure begins with reacting a flexible polyurethane foam composition comprising a polyisocyanate, a polyether polyol, a surfactant, a catalyst system, water, and, optionally, a halogenated hydrocarbon blowing agent to provide a foamed product. The next step comprises conditioning the foam product which involves storing the product for a sufficient time and temperature to ensure that the product attains a fully cured state necessary to optimize recovery after compression. After conditioning, a compressing force is applied to the product to reduce its size to permit greater quantity of product to be shipped in a particular volume of shipping container. The compressed foam product is shipped to the ultimate destination where the compressing force is removed so that the foam product may return to its original size. With regard to flexible molded polyurethane foam, the compression force would result from the stacking of the product in the shipping container.

The present invention provides for reducing the conditioning time prior to compressing the foam product while concomitantly ensuring the restitution of the foam product substantially to its original size upon removal of the compression force. These advantages are obtained by the use of a tertiary amine compound having a morpholine moiety in its structure, specifically an N-hydrocarbylmorpholine or an N-(dialkylaminoalkyl) morpholine, as the major portion of the catalyst system in the flexible polyurethane foam composition.

The invention provides a flexible polyurethane foam processor with numerous economic benefits which are a direct result of a shorter storage, or conditioning, time to achieve full care, namely, quicker turnaround time for the foam product, reduced inventory of finished foam product, reduced storage temperatures, reduction in scrap foam resulting from compressed shipment, and reduction in the need for oversize cutting.

DETAILED DESCRIPTION OF THE INVENTION

In a typical flexible polyurethane foam process liquid reactants are poured onto a moving conveyor. The reactants start foaming up and produce a polyurethane bun approximately 6 ft. wide and 4 ft. high, for example. These buns are cut at designated lengths and then sent to a storage room for conditioning. After conditioning for up to 10 days, depending on the particular polyurethane formulation and temperature of the storage room, the buns may be cut and shipped or fabricated. If shipped, the buns may be transported in compression trailers which compress the foam down, for example, to approximately 30% of its original height. Typically the buns are cut larger than the desired end use specification size due to the lack of full restitution, or recovery, after removal from the compression trailers.

The operative limits on processing flexible polyurethane foam product is dependent on the type of equipment in mixing and foaming the polyurethane composition and the desired physical properties for the polyurethane foam. If the polyurethane foam buns are not stored for the proper time, they will not return sufficiently to their original height after transporting in compression set trailers. Such buns may end up as scrap foam. Often when foams are not cut greater than the desired dimensions, they will be undersized after enduring a period of compression in the shipping trailers and, thus, will also be scrap foam. Since yields are a function of the amount of scrap foam produced, improper storage and oversize cutting reduces these yields and imposes an economic penalty on the flexible polyurethane processors.

Flexible polyurethane foam formulations generally will include a polyisocyanate, a polyester or polyether polyol, a surfactant, a catalyst system, water, and in some cases, a blowing agent such as methylene chloride or trichlorofluoromethane. Additional additives such as flame retardants and fillers may also be employed.

Polyisocyanates which may be used according to the invention are those well known in the art for preparing flexible polyurethane foams. Examples of these would include the 2,4- and 2,6-toluenediisocyanates in mixtures (80:20 or 65:35) of the two isomers and methylenediphenylisocyanate.

Also suitable starting materials for the production of the flexible polyurethanes in the process according to the invention are the so-called prepolymers which are the reaction products of a polyol with excess polyisocyanate.

It has been discovered that the advantages achieved by the invention only accrue to those flexible polyurethane compositions which contain a polyether polyol and not a polyester polyol. The polyether polyols include the homopolymers of alkylene oxides such as ethylene oxide, propylene oxide and the like and alkylene oxide adducts of polyhydroxyalkanes such as, ethylene glycol, propylene glycol, trimethylol propane, pentaerythritol, sorbitol, and the like, trialkanolamines, such as triethanolamine and triisopropanolamine, mono- and polyamines, such as ethylamine, ethylenediamine, diethylenetriamine, phenylenediamines, toluenediamine, and the like, non-reducing sugars and sugar derivatives, such as sucrose and methylglucoside.

For flexible polyurethane compositions the polyol or polyol mixture employed can have hydroxyl numbers which vary from about 20 to about 70 or more. The hydroxyl number is defined as the number of milligrams of potassium hydroxide required for the complete neutralization of the hydrolysis product of the fully acetylated derivative prepared from 1 gram of polyol. The hydroxyl number can also be defined by the equation $$OH = \frac{56.1 \times 1000 \times f}{\text{Mol. Wt.}}$$

where:  OH = hydroxyl number of polyol
$f$ = average functionality, i.e. average number of hydroxyl groups per molecule of polyol
Mol. Wt. = average molecular weight of the polyol Surfactants which are normally used are the silicone surfactants such as siloxane polyalkylene oxide copolymers.

The key to speeding up the conditioning of the flexible polyurethane foamed product, that is to say shortening the time and/or lowering the temperature for the storage of the product until substantially fully cured, is the particular tertiary amine catalyst employed, namely an N-alkyl or N-(dialkylaminoalkyl)morpholine compound. Such morpholine-containing compounds may be represented by the following general formula

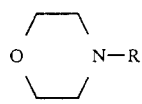

where R = a $C_1$-$C_{18}$ hydrocarbyl group, especially a $C_1$-$C_4$ alkyl group, or

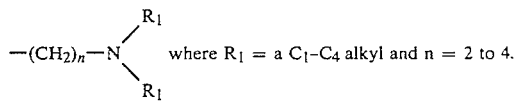  where $R_1$ = a $C_1$-$C_4$ alkyl and n = 2 to 4.

Examples of suitable morpholine-containing catalysts include N-methylmorpholine, N-ethylmorpholine, N-propylmorpholine, N-butylmorpholine, N-cocomorpholine, 4-(2-dimethylaminoethyl)morpholine, 4-(2-diethylaminopropyl)morpholine, 4-(2-dimethylaminobutyl)morpholine and the like. The morpholine-containing compound may comprise the sole amine catalyst or it may be used as the major portion of the amine catalyst, i.e. greater than about 50 wt %, in combination with another tertiary amine such as triethylenediamine, bis(dimethylaminoethyl)ether and dimethylethanolamine. A tin compound such as stannous octoate or dibutyl tin dilaurate may also be included in the catalyst system. The catalyst is used in such catalytic amounts as are normally used in the art, for example about 0.1 to about 1.0 parts per 100 parts of polyol.

The following examples are intended to illustrate the invention and not restrict the scope thereof.

EXAMPLE 1

The following flexible polyurethane formulations were used to evaluate the relationship between the compression set properties of the foam products and the amine catalyst used:

|  | Formulations | |
|---|---|---|
|  | A | B |
| VORANOL 3137[a] | 100 g | 100 g |
| SILICONE Q2-5125[b] | 1.3 | 1.2 |
| CFCl$_3$ | 7.6 | 0 |
| AMINE CATALYST | — | — |
| WATER | 4.5 | 3.8 |
| FLAME RETARDANT | 0 | 9 |
| STANNOUS OCTOATE | .25 | .21 |
| TOLUENE DIISOCYANATE | 58.6 | 50 |

[a] a polyether polyol (Mol. Wt. = 3000, OH = 56) marketed by Dow Chemical.
[b] a silicone surfactant marketed by Dow Corning.

Foam hand mixes were prepared using flexible polyurethane foam formulations A and B containing the following amine catalysts: triethylenediamine (TEDA) 0.27 g; 4-(2-dimethylaminoethyl)morpholine (DMAEM) 0.34 g; and a mixture comprising triethylenediamine, dimethylethanolamine (DMEA) and bis(dimethylaminoethyl)ether (DMEE) 0.31 g. The amount of catalyst used was chosen so that the rise time of each would be substantially the same. Six foams were prepared using each catalyst, three were placed immediately into a freezer at 23° F. (−5° C.) and three were placed in a controlled temperature and humidity room at 68° F. (20° C.) and 50% relative humidity. The foams were tested for compression set according to the procedure of ASTM D 3574-74 TEST D with the exception of the temperature and time of storage. The percent compression set values are calculated as follows:

$$\frac{\text{height (original)} - \text{height (final)}}{\text{height (original)}} \times 100 = \% \text{ compression set}$$

TABLE 1

| CATALYST | FORMULATION | °C. | COMPRESSION SET % (Foam Curing Time) | | | | | |
|---|---|---|---|---|---|---|---|---|
| | | | 75% (24 hr) | 75% (60 hr) | 75% (72 hr) | 90% (24 hr) | 90% (60 hr) | 90% (72 hr) |
| TEDA | A | 20 | 7.4 | — | 6.1 | 15.5 | — | 9.4 |
| | A | −5 | 46.9 | — | 8.0 | 85.8 | — | 17.6 |
| | B | 20 | 5.7 | 4.5 | — | 9.6 | 13.3 | — |
| | B | −5 | 5.3 | 5.1 | — | 10.5 | 19.6 | — |
| MIX | A | 20 | 8.9 | — | 7.2 | 60.8 | — | 11.3 |
| | A | −5 | 16.8 | — | 8.2 | 83.1 | — | 17.6 |
| | B | 20 | 5.7 | 7.6 | — | 7.5 | 16.8 | — |
| | B | −5 | 6.9 | 5.2 | — | 54.5 | 15.1 | — |
| DMAEM | A | 20 | 5.9 | — | 6.2 | 1.5 | — | 8.7 |
| | A | −5 | 6.3 | — | 6.0 | 18.6 | — | 10.9 |
| | B | 20 | 4.7 | 4.3 | — | 7.2 | 9.0 | — |
| | B | −5 | 6.0 | 4.8 | — | 8.3 | 9.1 | — |

TEDA = triethylenediamine
MIX = triethylenediamine + dimethylethanolamine + bis(dimethylamino-ethyl)ether
DMAEM = 4-(2-dimethylaminoethyl)morpholine From the data in Table 1 it can be seen that 4-(2-dimethylaminoethyl)morpholine provided the flexible foamed product with superior restitution properties when subjected to a 90% compression set for the times indicated, i.e. the significantly lower values obtained with the DMAEM catalyst, particularly at the colder temperature of −5° C., compared to the prior art catalysts indicate a smaller deviation from the original dimensions. With regard to the 75% compression set data the DMAEM catalyzed foam in general showed better recovery from compression in both formulations A and B at both 20° C. and −5° C. storage temperatures with the exception of TEDA in formulation B at −5° C. for 24 hours.

EXAMPLE 2

Blends of DMAEM with TEDA were prepared and evaluated against TEDA and DMAEM individually. The following catalyst compositions were tested in formulation B at the use levels indicated in Table 2.

TABLE 2

| CATALYST | USE LEVEL | TEMP °C. | 90% COMPRESSION SET | | |
|---|---|---|---|---|---|
| | | | 24 hr | 48 hr | 96 hr |
| TEDA | 0.27 | 20 | 80.0 | 5.6 | 7.4 |
| | | −5 | 85.4 | 78.5 | 9.0 |
| TEDA:DMAEM (3:1) | 0.28 | 20 | 69.4 | 50.0 | 7.1 |
| | | −5 | 86.7 | 83.2 | 9.0 |
| TEDA:DMAEM (1:1) | 0.33 | 20 | 50.2 | 6.8 | 7.8 |
| | | −5 | 84.2 | 33.4 | 7.2 |
| TEDA:DMAEM (1:3) | 0.36 | 20 | 13.0 | 6.7 | 6.4 |
| | | −5 | 86.1 | 6.1 | 7.4 |
| DMAEM | 0.38 | 20 | 7.7 | 6.9 | 6.3 |
| | | −5 | 85.6 | 6.4 | 7.5 |

The data shows that when DMAEM is present in greater than about 50% of the catalyst combination for flexible polyurethane foam stored at −5° C. for 48 hours the recovery of the compressed foam product is significantly greater than for the other catalysts. This indicates that when foam products are prepared using a catalyst composition containing as a major portion DMAEM, the resultant product need be stored for a lesser period of time at the cooler temperatures such as less than about 5° C. to attain substantially complete cure.

EXAMPLE 3

Foam products were prepared using formulations B and either TEDA, DMAEM or N-ethylmorpholine (NEM) as the catalyst and were held under cure conditions of 20° C., 50% relative humidity. Table 3 shows the data obtained for 90% compression set.

TABLE 3

| CATALYST | 90% COMPRESSION SET | | | | |
|---|---|---|---|---|---|
| | 12 hr | 24 hr | 36 hr | 48 hr | 60 hr |
| TEDA | 87.9 | 82.0 | 72.2 | 20.4 | 11.0 |
| DMAEM | 9.0 | 8.8 | 7.2 | 6.4 | 6.6 |
| NEM | 7.8 | 6.6 | 6.5 | 6.0 | 6.7 |

The data shows the improvement in restitution of foam products prepared using morpholine containing catalyst compounds according to the invention.

EXAMPLE 5

In this example numerous polyurethane catalysts were tested in polyurethane foam formulation B and the foams were subsequently cured at −5° C.

TABLE 4

| CATALYST | USE LEVEL | 90% COMPRESSION SET | | |
|---|---|---|---|---|
| | | 24 hr | 48 hr | 72 hr |
| PMPD | 0.5 | 88.2 | 80.7 | 14.4 |
| BDMPM | 0.2 | 86.7 | 60.1 | 10.5 |
| DMAEM | 0.37 | 88.0 | 9.2 | 7.5 |
| DMDEE | 0.8 | 88.2 | 84.7 | 81.3 |
| DMEE | 0.1 | 88.4 | 85.2 | 60.8 |
| NEM | 1.8 | 88.6 | 9.2 | 6.3 |
| NMM | 1.5 | 88.9 | 8.2 | 6.5 |
| DCM | 1.1 | shrunk | shrunk | shrunk |

PMPD = N,N,N',N'-2-pentamethyl-1,2-propanediamine
BDMPM = bis(dimethylaminopropyl)methylamine
DMAEM = 4-(2-dimethylaminoethyl)morpholine
DMDEE = dimorpholinodiethylether
DMEE = bis(dimethylaminoethyl)ether
NEM = N—ethyl morpholine
NMM = N—methyl morpholine
DCM = dicyclohexylmethylamine The data in Table 4 shows the surprising improvement in restitution of flexible polyurethane foam products stored at −5° C. using the morpholine moiety containing compounds DMAEM, NEM and NMM. Very surprisingly DMDEE which contains two morpholino moieties per molecule showed the worst compression set data.

EXAMPLE 6

In this example a flexible polyurethane foam composition containing a polyester polyol was prepared using DMAEM and NEM as the catalysts. The following formulation was used:

| FOMREZ 50[a] | 100 g |
|---|---|
| WATER | 3.8 |
| L 532[b] | 1.2 |
| CATALYST | 2.0 |
| TOLUENE DIISOCYANATE | 49.5 |

[a]trimethylol propane branched glycol adipate (OH = 52) marketed by Witco Chemical Co.
[b]Surfactant marketed by Union Carbide The NEM was used at a level of 1.5 g and the DMAEM was used at a level of 0.6 g. The foam products were stored at a conditioning temperature of 20° C. and 50% relative humidity. Table 5 shows the data obtained for 90% compression set testing.

TABLE 5

| CATALYST | 90% COMPRESSION SET | | |
|---|---|---|---|
| | 24 hr | 48 hr | 72 hr |
| NEM | 82.4 | 77.9 | 80.7 |
| DMAEM | 85.6 | 83.5 | 85.0 |

It is readily apparent from the data in Table 5 that the advantages in reducing the conditioning time and/or temperatures obtained using certain morpholine containing catalysts in making flexible polyurethane foamed products is only observed when such flexible polyurethane foam compositions contain a polyether polyol and not a polyester polyol.

STATEMENT OF INDUSTRIAL APPLICATION

The invention provides for improved processing of flexible polyurethane foam products by permitting processors to reduce conditioning time and/or temperature for storing the product in order to develop substantially full cure so that upon compression shipment of the products they will substantially return to their full size.

We claim:

1. In a method for shipping flexible polyurethane foam product comprising (a) reacting a flexible polyurethane foam composition containing a polyisocyanate, a polyether polyol, a surfactant, a catalyst system and water to provide a foam product, (b) conditioning the foam product by storing for a time and at a temperature sufficient to develop substantially full cure, (c) applying a force to compress the product to reduce its size, (d) shipping the compressed product and (e) removing the compression force so that the product may return to its original size, the improvement for reducing the conditioning time or temperature to develop substantially full cure prior to compressing the foam product while ensuring the substantial restitution of the foam product when the compression force is removed which improvement comprises employing in the flexible polyurethane foam composition a polyurethane amine catalyst system in which the major portion is N-($C_1$-$C_{18}$) hydrocarbyl morpholine or N-[di($C_1$-$C_4$)alkylamino ($C_2$-$C_4$)alkyl] morpholine.

2. The method of claim 1 in which the N-($C_1$-$C_{18}$) hydrocarbyl morpholine is an N-($C_1$-$C_4$) alkyl morpholine.

3. The method of claim 1 in which the catalyst is 4-(2-dimethylaminoethyl)morpholine.

4. The method of claim 1 in which the catalyst is N-ethyl morpholine.

5. The method of claim 1 in which the catalyst is N-methyl morpholine.

6. The method of claim 1 in which the foam product is conditioned at a temperature less than 5° C.

7. The method of claim 1 in which the foam product is conditioned at a temperature about −5° C.

8. The method of claim 3 in which the foam product is conditioned at a temperature less the about −5° C.

9. The method of claim 3 in which the foam product is conditioned at a temperature about −5° C.

10. In a method for shipping flexible polyurethane foam product comprising (a) reacting a flexible polyurethane foam composition containing a polyisocyanate, a polyether polyol, a surfactant, a catalyst system and water to provide a foam product, (b) conditioning the foam product by storing for a time and at a temperature sufficient to develop substantially full cure, (c) oversize cutting the foam product, (d) applying a force to compress the oversized product to reduce its size for shipping, (e) shipping the compressed product and (f) removing the compression force so that the product may return the desired size, the improvement for reducing the oversize cutting of the foam product by reducing the conditioning time or temperature to develop substantially full cure which comprises employing in the flexible polyurethane foam composition a polyurethane catalyst in which the major portion is N-($C_1$-$C_4$)alkyl morpholine or N-[di($C_1$-$C_4$)alkylamino ($C_2$-$C_4$)alkyl] morpholine.

11. In a method for shipping flexible polyurethane foam product comprising (a) reacting a flexible polyurethane foam composition containing a polyisocyanate, a polyether polyol, a surfactant, a catalyst system and water to provide a foam product, (b) conditioning the foam product by storing for a time and at a temperature sufficient to develop substantially full cure, (c) applying a force to compress the product to reduce its size, (d) shipping the compressed product and (e) removing the compression force so that the product may return to its original size, the improvement for reducing the conditioning time or temperature to develop substantially full cure prior to compressing the foam product while ensuring the substantial restitution of the foam product when the compression force is removed which improvement comprises employing in the flexible polyurethane foam composition a polyurethane amine catalyst system which is N-($C_1$-$C_4$) alkyl morpholine or N-[di($C_1$-$C_4$)alkylamino ($C_2$-$C_4$) alkyl] morpholine.

12. The method of claim 11 in which the catalyst is 4-(2-dimethylaminoethyl)morpholine.

13. The method of claim 11 in which the catalyst is N-ethyl morpholine.

14. The method of claim 11 in which the catalyst is N-methyl morpholine.

15. The method of claim 11 in which the foam product is conditioned at a temperature less than 5° C.

16. The method of claim 11 in which the foam product is conditioned at a temperature about −5° C.

17. The method of claim 2 in which the foam product is conditioned at a temperature less than 5° C.

18. The method of claim 2 in which the foam product is conditioned at a temperature about −5° C.

19. The method of claim 1 in which the minor portion of the polyurethane amine catalyst system is triethylenediamine.

20. The method of claim 3 in which the minor portion of the polyurethane amine catalyst system is triethylenediamine.

* * * * *

UNITED STATES PATENT AND TRADEMARK OFFICE
CERTIFICATE OF CORRECTION

PATENT NO. : 4,525,316

DATED : 25 June 1985

INVENTOR(S) : Edward A. Galla and Bruce A. Smoyer

It is certified that error appears in the above-identified patent and that said Letters Patent is hereby corrected as shown below:

Column 8, line 8, the first occurrence of the word --the-- should read --than--.

Signed and Sealed this

Twentieth Day of May 1986

[SEAL]

Attest:

DONALD J. QUIGG

Attesting Officer

Commissioner of Patents and Trademarks